United States Patent
Hodzen

(10) Patent No.: US 7,950,222 B2
(45) Date of Patent: May 31, 2011

(54) SYSTEM AND METHOD FOR CLEANING COMBUSTION SOOT FROM EXHAUST GAS TREATMENT SENSORS

(75) Inventor: Edmund P. Hodzen, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 955 days.

(21) Appl. No.: 11/829,589

(22) Filed: Jul. 27, 2007

(65) Prior Publication Data

US 2009/0025374 A1    Jan. 29, 2009

(51) Int. Cl.
F02B 27/04 (2006.01)
F01N 3/00 (2006.01)
G01N 7/00 (2006.01)
G01N 33/497 (2006.01)
G01N 27/26 (2006.01)
F02D 41/00 (2006.01)

(52) U.S. Cl. ............ 60/276; 60/273; 60/285; 60/295; 73/23.33; 123/703; 204/401; 204/402

(58) Field of Classification Search .......... 60/273, 60/276, 277, 285, 295, 299, 300; 73/23.32, 73/114.71–114.73, 23.33; 123/688, 703; 204/401, 402; 701/109, 114
See application file for complete search history.

(56) References Cited

U.S. PATENT DOCUMENTS

| | | |
|---|---|---|
| 4,938,861 A | 7/1990 | Kurosawa et al. |
| 5,137,616 A | 8/1992 | Poor et al. |
| 5,146,900 A | 9/1992 | Sekiya |
| 5,211,820 A | 5/1993 | Poor et al. |
| 6,136,170 A | 10/2000 | Inoue et al. |
| 6,742,335 B2 | 6/2004 | Beck et al. |
| 6,812,436 B2 | 11/2004 | Nomura et al. |
| 6,823,667 B2 | 11/2004 | Braun et al. |
| 6,877,312 B2 * | 4/2005 | Nakatani et al. ............. 60/288 |
| 6,939,037 B2 | 9/2005 | Junginger et al. |
| 7,029,510 B2 | 4/2006 | Frankle et al. |
| 2005/0150214 A1 | 7/2005 | Crawley et al. |
| 2005/0150215 A1 | 7/2005 | Taylor, III et al. |
| 2006/0288689 A1 * | 12/2006 | Shimoda ..................... 60/275 |
| 2008/0034839 A1 * | 2/2008 | Ante et al. ................. 73/23.31 |

FOREIGN PATENT DOCUMENTS

WO    WO 2004104385 A1 * 12/2004
WO    WO 2005078423 A1 *  8/2005

* cited by examiner

Primary Examiner — Thomas E Denion
Assistant Examiner — Audrey Klasterka
(74) Attorney, Agent, or Firm — Barnes & Thornburg LLP

(57) ABSTRACT

A system and method are provided for cleaning combustion soot from an exhaust gas aftertreatment sensor. The system and method determine whether to conduct a sensor desoot event, and if it is determined that a sensor desoot event is to be conducted, the exhaust gas temperature is increased such that the temperature of the sensor correspondingly increases to or above a desoot temperature, the exhaust gas temperature is then controlled to maintain the temperature of the sensor at or above the desoot temperature for a predefined time period, and the exhaust gas temperature is then decreased after the temperature of the sensor has been at or above the desoot temperature for the predefined time period.

19 Claims, 5 Drawing Sheets

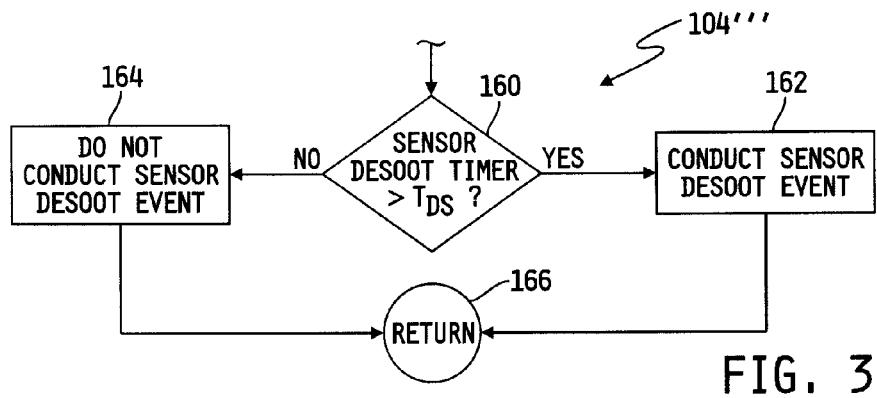
FIG. 3C
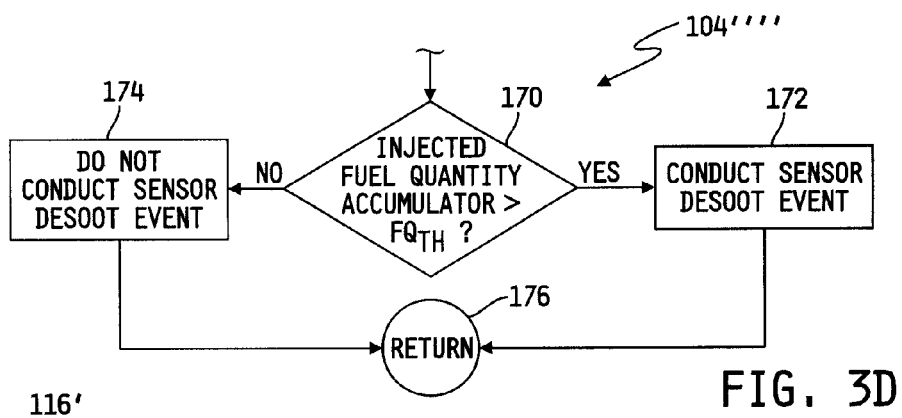
FIG. 3D
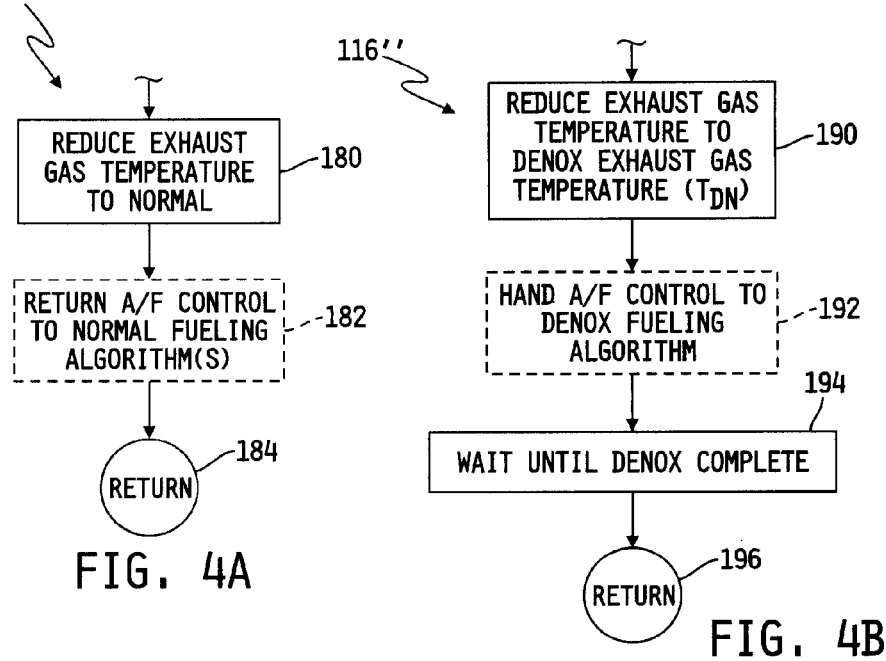
FIG. 4A
FIG. 4B

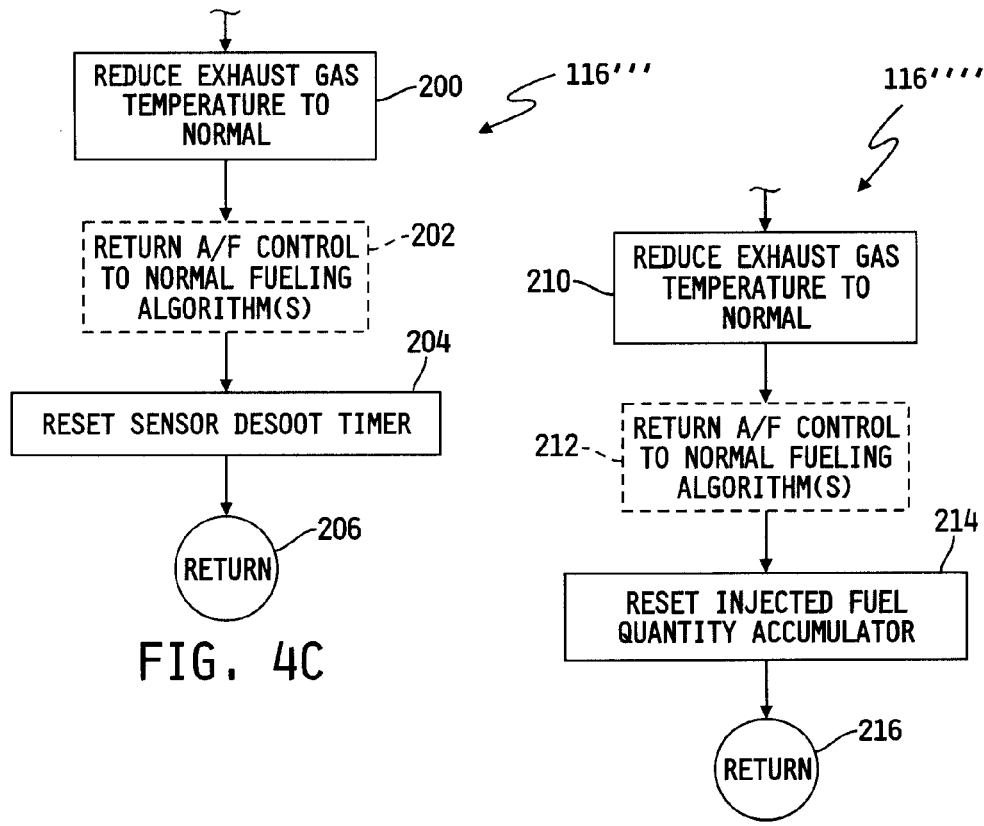
FIG. 4C
FIG. 4D
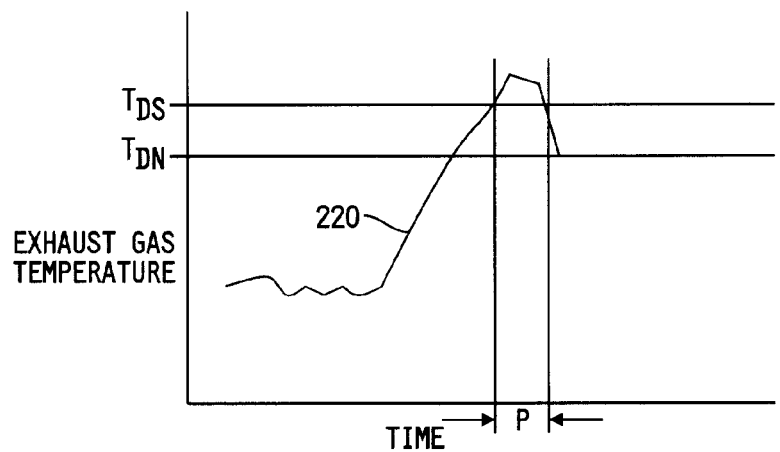
FIG. 5

SYSTEM AND METHOD FOR CLEANING COMBUSTION SOOT FROM EXHAUST GAS TREATMENT SENSORS

FIELD OF THE INVENTION

The present invention relates generally to exhaust gas aftertreatment systems for internal combustion engines, and more specifically to systems and methods for cleaning combustion soot from sensors associated with such exhaust gas aftertreatment systems.

BACKGROUND

During normal operation of an internal combustion engine, one or more sensors associated with an exhaust gas aftertreatment system may accumulate combustion soot thereon from exhaust gas produced by the engine. It is desirable to automatically clean the combustion soot from such one or more sensors from time to time.

SUMMARY

The present invention may comprise one or more of the features recited in the attached claims, and/or one or more of the following features and combinations thereof. A method is provided for cleaning combustion soot from a sensor associated with an exhaust gas aftertreatment system configured to receive exhaust gas produced by an internal combustion engine. The method may comprise determining whether to conduct a sensor desoot event, and, if it is determined that a sensor desoot event is to be conducted, increasing exhaust gas temperature such that a temperature of the sensor correspondingly increases to or above a desoot temperature, controlling the exhaust gas temperature to maintain the temperature of the sensor at or above the desoot temperature for a predefined time period, and reducing the exhaust gas temperature after the temperature of the sensor has been at or above the desoot temperature for the predefined time period.

The method may further comprise controlling a ratio of air and fuel supplied to the engine in a manner that increases an oxygen content of the exhaust gas for at least part of the predefined time period. The method may further comprise controlling the ratio of air and fuel supplied to the engine in a manner that decreases the oxygen content of the exhaust gas after the temperature of the sensor has been at or above the desoot temperature for the at least part of the predefined time period.

The method may further comprise carrying out the acts of increasing exhaust gas temperature, controlling the exhaust gas temperature and reducing the exhaust gas temperature only if regeneration of an exhaust gas aftertreatment component comprising part of the exhaust gas aftertreatment system is neither in process nor is about to occur.

Determining whether to conduct a sensor desoot event may comprise measuring an oxygen concentration of the exhaust gas at a current ratio of air and fuel supplied to the engine, modifying the ratio of air and fuel supplied to the engine to produce a discernibly different oxygen concentration of the exhaust gas, measuring the oxygen concentration of the exhaust gas after modifying the ratio of air and fuel supplied to the engine, and determining that a sensor desoot event is to be conducted if a difference between the measured oxygen concentration prior to modification of the ratio of air and fuel and the measured oxygen concentration after modification of the ratio of air and fuel does not exceed a threshold value within a predetermined time period following modification of the ratio of air and fuel, and otherwise determining that a sensor desoot event is not to be conducted. Reducing the exhaust gas temperature may comprise reducing the exhaust gas temperature to a normal exhaust gas temperature.

Determining whether to conduct a sensor desoot event may alternatively or additionally comprise determining whether regeneration of a NOx catalyst comprising part of the exhaust gas aftertreatment system has been commanded, and determining that a sensor desoot event is to be conducted if regeneration of the NOx catalyst has been commanded, and otherwise determining that a sensor desoot event is not to be conducted. Reducing the exhaust gas temperature may comprise reducing the exhaust gas temperature to a NOx regeneration temperature. The method may further comprise controlling fueling of the engine according to a NOx regeneration fueling algorithm.

Determining whether to conduct a sensor desoot event may alternatively or additionally comprise determining whether a time period since last conducting a sensor desoot event has elapsed, and determining that a sensor desoot event is to be conducted if the time period since last conducting a sensor desoot event has elapsed. Reducing the exhaust gas temperature may comprise reducing the exhaust gas temperature to a normal exhaust gas temperature.

Determining whether to conduct a sensor desoot event may alternatively or additionally comprise determining whether a predetermined amount of fuel has been supplied to the engine since last conducting a sensor desoot event, and determining that a sensor desoot event is to be conducted if at least the predetermined amount of fuel has been supplied to the engine since last conducting a sensor desoot event. Reducing the exhaust gas temperature may comprise reducing the exhaust gas temperature to a normal exhaust gas temperature.

A method is also provided for cleaning combustion soot from at least one of a number of sensors associated with an exhaust gas aftertreatment system configured to receive exhaust gas produced by an internal combustion engine. The method may comprise determining whether to conduct a sensor desoot event, and, if it is determined that a sensor desoot event is to be conducted, increasing exhaust gas temperature such that a temperature of the at least one of the number of sensors correspondingly increases to or above a desoot temperature, controlling the exhaust gas temperature to maintain the temperature of the at least one of the number of sensors at or above the desoot temperature for a predefined time period, and reducing the exhaust gas temperature after the temperature of the at least one of the number of sensors has been at or above the desoot temperature for the predefined time period.

A system for cleaning combustion soot from an exhaust gas aftertreatment sensor, the system may comprise an exhaust gas conduit fluidly coupled to an exhaust manifold of an internal combustion engine, wherein the exhaust gas conduit is configured to receive therethrough exhaust gas produced by the engine. An oxidation catalyst may be disposed in-line with the exhaust gas conduit, and the sensor may be in fluid communication with the exhaust gas conduit downstream of the oxidation catalyst. At least one exhaust gas aftertreatment component may be disposed in-line with the exhaust gas conduit downstream of the oxidation catalyst. A fuel system may be responsive to a fueling signal to supply fuel to the engine. A control circuit may be configured to produce the fueling signal. The control circuit may include a memory having stored therein instructions that are executable by the control circuit to determine whether to conduct a sensor desoot event, and to conduct the sensor desoot event, only if it is determined that the sensor desoot event is to be conducted, by controlling the fueling signal in a manner that causes the oxidation catalyst to increase a temperature of exhaust gas exiting therefrom such that a temperature of the sensor is at or above a desoot temperature, thereafter controlling the fueling signal in a manner that causes the oxidation catalyst to maintain the temperature of the sensor at or above the desoot temperature for a predefined time period, and thereafter controlling the fueling signal in a manner that causes the oxidation catalyst to decrease the temperature of exhaust gas exiting therefrom.

The instructions stored in the memory may further include instructions that are executable by the control circuit to control a ratio of air and fuel supplied to the engine in a manner that increases an oxygen content of the exhaust gas for at least part of the predefined time period. The instructions stored in the memory may further include instructions that are executable by the control circuit to control the ratio of air and fuel supplied to the engine in a manner that decreases the oxygen content of the exhaust gas after the temperature of the sensor has been at or above the desoot temperature for the at least part of the predefined time period.

The instructions stored in the memory that are executable by the control circuit to determine whether to conduct a sensor desoot event may include instructions that are executable by the control circuit to measure an oxygen concentration of the exhaust gas at a current ratio of air and fuel supplied to the engine, to then modify the ratio of air and fuel supplied to the engine to produce a discernibly different oxygen concentration of the exhaust gas, to measure the oxygen concentration of the exhaust gas after modification of the ratio of air and fuel supplied to the engine, and to then determine that a sensor desoot event is to be conducted if a difference between the measured oxygen concentration prior to modification of the ratio of air and fuel and the measured oxygen concentration after modification of the ratio of air and fuel does not exceed a threshold value within a predetermined time period following modification of the ratio of air and fuel, and otherwise determining that a sensor desoot event is not to be conducted. The sensor may be an oxygen sensor configured to produce an oxygen signal corresponding to an oxygen concentration of the exhaust gas, and measuring an oxygen concentration of the exhaust gas may comprise processing the oxygen signal to determine the oxygen concentration of the exhaust gas.

The at least one exhaust gas aftertreatment component may be or include a NOx catalyst. The instructions stored in the memory that are executable by the control circuit to determine whether to conduct a sensor desoot event may alternatively or additionally include instructions that are executable by the control circuit to determine whether regeneration of the NOx catalyst has been commanded, and to determine that a sensor desoot event is to be conducted only if regeneration of the NOx catalyst has been commanded. The instructions stored in the memory that are executable by the control circuit to control the fueling signal in a manner that causes the oxidation catalyst to decrease the temperature of exhaust gas exiting therefrom may further include instructions to control the fueling signal in a manner that causes the oxidation catalyst to decrease the temperature of exhaust gas exiting therefrom to a NOx catalyst regeneration temperature. The instructions stored in the memory that are executable by the control circuit may further include instructions to control the fueling signal in accordance with a NOx regeneration fueling algorithm after controlling the fueling signal in a manner that causes the oxidation catalyst to decrease the temperature of exhaust gas exiting therefrom to a NOx catalyst regeneration temperature.

The instructions stored in the memory that are executable by the control circuit to determine whether to conduct a sensor desoot event may alternatively or additionally include instructions that are executable by the control circuit to determine whether a time period since last conducting a sensor desoot event has elapsed, and to determine that a sensor desoot event is to be conducted if the time period since last conducting a sensor desoot event has elapsed.

The instructions stored in the memory that are executable by the control circuit to determine whether to conduct a sensor desoot event may alternatively or additionally include instructions that are executable by the control circuit to determine whether a predetermined amount of fuel has been supplied to the engine since last conducting a sensor desoot event, and to determine that a sensor desoot event is to be conducted if at least the predetermined amount of fuel has been supplied to the engine since last conducting a sensor desoot event.

BRIEF DESCRIPTION OF THE DRAWINGS

FIG. 3C is a flowchart of yet another illustrative process for carrying out step 104 of the process illustrated in FIG. 2.

FIG. 3D is a flowchart of still another illustrative process for carrying out step 104 of the process illustrated in FIG. 2.

FIG. 4A is a flowchart of one illustrative process for carrying out step 116 of the process illustrated in FIG. 2.

FIG. 4B is a flowchart of another illustrative process for carrying out step 116 of the process illustrated in FIG. 2.

FIG. 4C is a flowchart of yet another illustrative process for carrying out step 116 of the process illustrated in FIG. 2.

FIG. 4D is a flowchart of still another illustrative process for carrying out step 116 of the process illustrated in FIG. 2.

FIG. 5 is a plot of exhaust gas temperature vs. time illustrating an embodiment of the process of FIG. 2 that is carried out prior to NOx regeneration of a NOx aftertreatment device.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
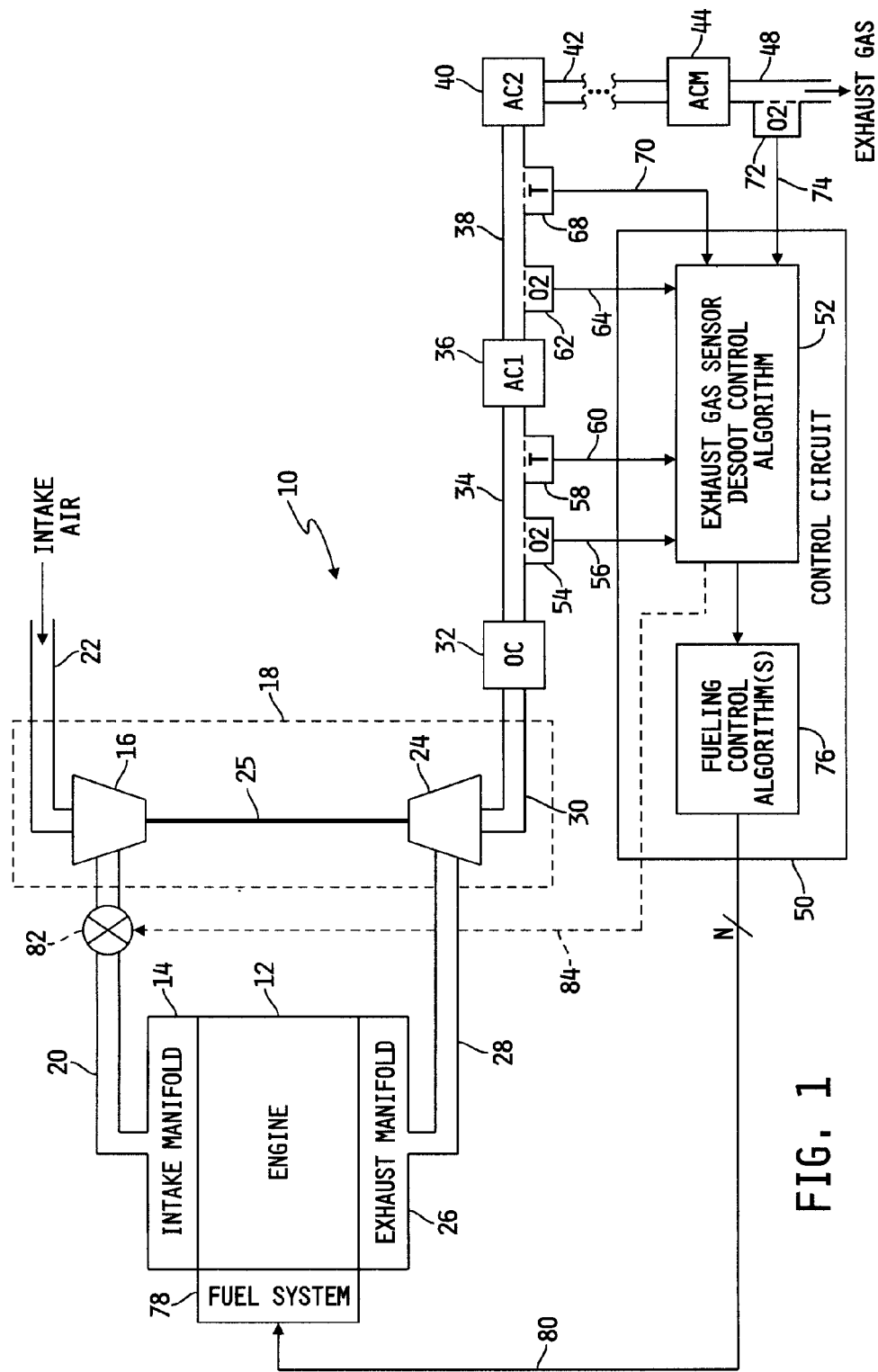
FIG. 1 is a block diagram of one illustrative embodiment of a system for cleaning combustion soot from exhaust gas aftertreatment sensors.

Referring now to FIG. 1, a block diagram of one illustrative embodiment of a system 10 for cleaning combustion soot from one or more exhaust gas aftertreatment sensors is shown. In the illustrated embodiment, the system 10 includes an internal combustion engine 12 having an intake manifold 14 fluidly coupled to a fresh air outlet of a compressor 16 of a turbocharger 18 via a conduit 20. A fresh air inlet of the compressor 16 is fluidly coupled to a fresh air intake conduit 22. A turbine 24 of the turbocharger 18 is mechanically coupled via a rotational drive shaft 25 to the compressor 16 in a conventional manner. An exhaust gas inlet of the turbine 24 is fluidly coupled to an exhaust manifold 26 of the engine 12 via an exhaust gas conduit 28. An exhaust gas outlet of the turbine 24 is fluidly coupled to a conventional oxidation catalyst 32. The turbocharger 18 may be included in some embodiments of the system 10 and may be omitted in other embodiments, and is accordingly illustrated in FIG. 1 as an optional component of the system 10 as indicated by the dashed-line enclosure surrounding the turbocharger 18. The oxidation catalyst 32 includes a conventional catalyst element that is responsive to hydrocarbons introduced into the exhaust gas stream at a location upstream of the oxidation catalyst 32 to elevate the temperature of the exhaust gas exiting the oxidation catalyst 32. Hydrocarbons may be introduced into the exhaust gas stream by any of a number of conventional techniques including, for example, but not limited to introducing additional fuel into the cylinders of the engine 12 at or near the end of, and/or after, combustion of a main quantity of fuel during each engine cycle or periodically over a number of engine cycles. In any case, hydrocarbons may be controllably introduced into the exhaust stream in a conventional manner to elevate the temperature of the exhaust gas exiting the oxidation catalyst to a temperature or temperature range suitable for regeneration of one or more downstream exhaust gas aftertreatment components.

The system 10 may include any number, M, of exhaust gas aftertreatment components, wherein M may be any positive integer, and in the embodiment illustrated in FIG. 1 the system 10 includes three exhaust gas aftertreatment catalysts 36, 40 and 44. An exhaust gas conduit 34 is fluidly coupled between the exhaust gas outlet of the oxidation catalyst 32 an exhaust gas inlet of the aftertreatment catalyst 36, an exhaust gas conduit 38 is fluidly coupled between an exhaust gas outlet of the aftertreatment catalyst 36 and the exhaust gas inlet of the aftertreatment catalyst 40, and an exhaust gas conduit 42 is fluidly coupled between the exhaust gas outlet of the aftertreatment component 40 and an exhaust gas inlet of the aftertreatment catalyst 44. Another conduit 48 is fluidly coupled between the exhaust gas outlet of the aftertreatment component 44 and ambient. The exhaust gas aftertreatment catalysts 36, 40, and 44 may each be or include any conventional exhaust gas aftertreatment component, and the catalyst 36, 40 and 44 may be alike or different in their construction and/or function. Examples of any of the exhaust gas aftertreatment catalyst 36, 40 and 44 may include, but are not limited to, a conventional NOx adsorber catalyst (NAC), a conventional particulate filter (PF), or the like.

The system 10 further includes a control circuit 50 that is configured to control the overall operation of the engine 12. In one embodiment, the control circuit 50 is a microprocessor-based control circuit typically referred to as an electronic or engine control module (ECM), or electronic or engine control unit (ECU). It will be understood, however, that the control circuit 50 may generally be or include one or more general purpose or application specific control circuits that are arranged and operable as will be described hereinafter.

The control circuit 50 includes, or is coupled to, a memory unit that has stored therein a number of software algorithms executable by the control circuit 50 to control various operations of the engine 12. One such algorithm 52 is illustrated in FIG. 1 in the form of an exhaust gas sensor desoot control algorithm that receives a number of signals from sensors associated with the exhaust gas aftertreatment system, and that produces one or more outputs to control one or more actuators associated with the engine 12 in a manner that provides for the cleaning of soot from one or more exhaust gas aftertreatment sensors. In this regard, the exhaust gas aftertreatment system comprising the components 32, 36, 40 and 44 includes a number of sensors positioned in fluid communication with various ones of the exhaust gas conduits 34, 38 and 48. In the illustrated embodiment, for example, a conventional oxygen sensor 54 is positioned in fluid communication with the exhaust gas conduit 34, and is electrically connected to the control circuit 50 via a signal path 56. The oxygen sensor 54 is configured to produce a signal on signal path 56 that is indicative of the concentration of oxygen in the exhaust gas exiting the outlet of the oxidation catalyst 32 and entering the exhaust gas inlet of the first aftertreatment catalyst 36. A conventional temperature sensor 58 is also positioned in fluid communication with the exhaust gas conduit 34, and is electrically connected to the control circuit 50 via a signal path 60. The temperature sensor 58 is configured to produce a signal that is indicative of the temperature of exhaust gas exiting the oxidation catalyst 32 and entering the first aftertreatment catalyst 36. Another conventional oxygen sensor 62 is positioned in fluid communication with the exhaust gas conduit 38, and is electrically connected to the control circuit 50 via a signal path 64. The oxygen sensor 62 is configured to produce a signal that is indicative of the concentration of oxygen in the exhaust gas exiting the aftertreatment catalyst 36 and entering the exhaust gas inlet of the second aftertreatment catalyst 40. Another conventional temperature sensor 68 is positioned in fluid communication with the exhaust gas conduit 38, and is electrically connected to the control circuit 50 via a signal path 70. The temperature sensor 68 is configured to produce a signal that is indicative of the temperature of exhaust gas exiting the exhaust gas outlet of the first aftertreatment catalyst 36 and entering the exhaust gas inlet of the second aftertreatment catalyst 40. Yet another conventional oxygen sensor 72 is positioned in fluid communication with the exhaust gas conduit 48, and is electrically connected to the control circuit 50 via a signal path 74. The oxygen sensor 72 is configured to produce a signal that is indicative of the concentration of oxygen in the exhaust gas exiting the last aftertreatment catalyst 44. The signals produced by each of the sensors 54, 58, 62, 68 and 72 are provided as inputs to the exhaust gas sensor desoot control algorithm 52 as illustrated in FIG. 1.

The control circuit 50 further includes one or more fueling control algorithms 76 that is/are responsive to a number of engine operating conditions, such as engine speed and other operating conditions, to determine appropriate fueling commands in a conventional manner. The one or more fueling control algorithms 76 further receive an output from the exhaust gas sensor desoot control algorithm 52, the details of which will be described in greater detail hereinafter. In any case, a conventional electronically controlled fuel system 78 is operatively coupled to the engine 12, and is electrically connected to the control circuit 50 via a number, N, of signal paths 80, wherein N may be any positive integer. The fueling commands produced by the one or more fueling control algorithms 76 are provided to the fuel system 78 via the number, N, of signal paths 80 to control the fuel system 78 in a conventional manner to supply fuel to the cylinders of the engine 12.

In some embodiments of the system 10, as shown by dashed-line representation in FIG. 1, a conventional intake air throttle 82 may be disposed in-line with the fresh air intake conduit 20 and electrically connected to the control circuit 50 via a signal path 84. In such embodiments, the memory unit of the control circuit 50 may have stored therein one or more conventional algorithms that produce a control signal on the signal path 84 to control the operation of the intake air throttle 82 in a conventional manner to selectively control the flow of fresh air to the intake manifold 14 of the engine 12. In embodiments of the system 10 that include the intake air throttle 82, the exhaust gas sensor desoot control algorithm may produce the control signal on the signal path 84, or may alternatively produce a signal or value from which the control signal provided on the signal path 84 is derived, to selectively control the flow of fresh air to the intake manifold 14.

The control circuit 50 is operable in a conventional manner to control the air-to-fuel ratio (A/F) supplied to the cylinders of the engine 12. In embodiments of the system 10 that do not include the intake air throttle 82, the control circuit 50 is operable in a conventional manner to control A/F principally by controlling fueling of the engine 12, via control of the fuel system 78 as described above, for a given, e.g., measured, mass flow rate of fresh air supplied to the intake manifold 14 via the intake air conduit 20. In embodiments of the system 10 that include the intake air throttle 82, the control circuit 50 may be operable in a conventional manner to control A/F by controlling fueling, via control of the fuel system 78, and/or by controlling the mass flow rate of fresh air supplied to the intake manifold 14, via control of the intake air throttle 82.

Figure 2:
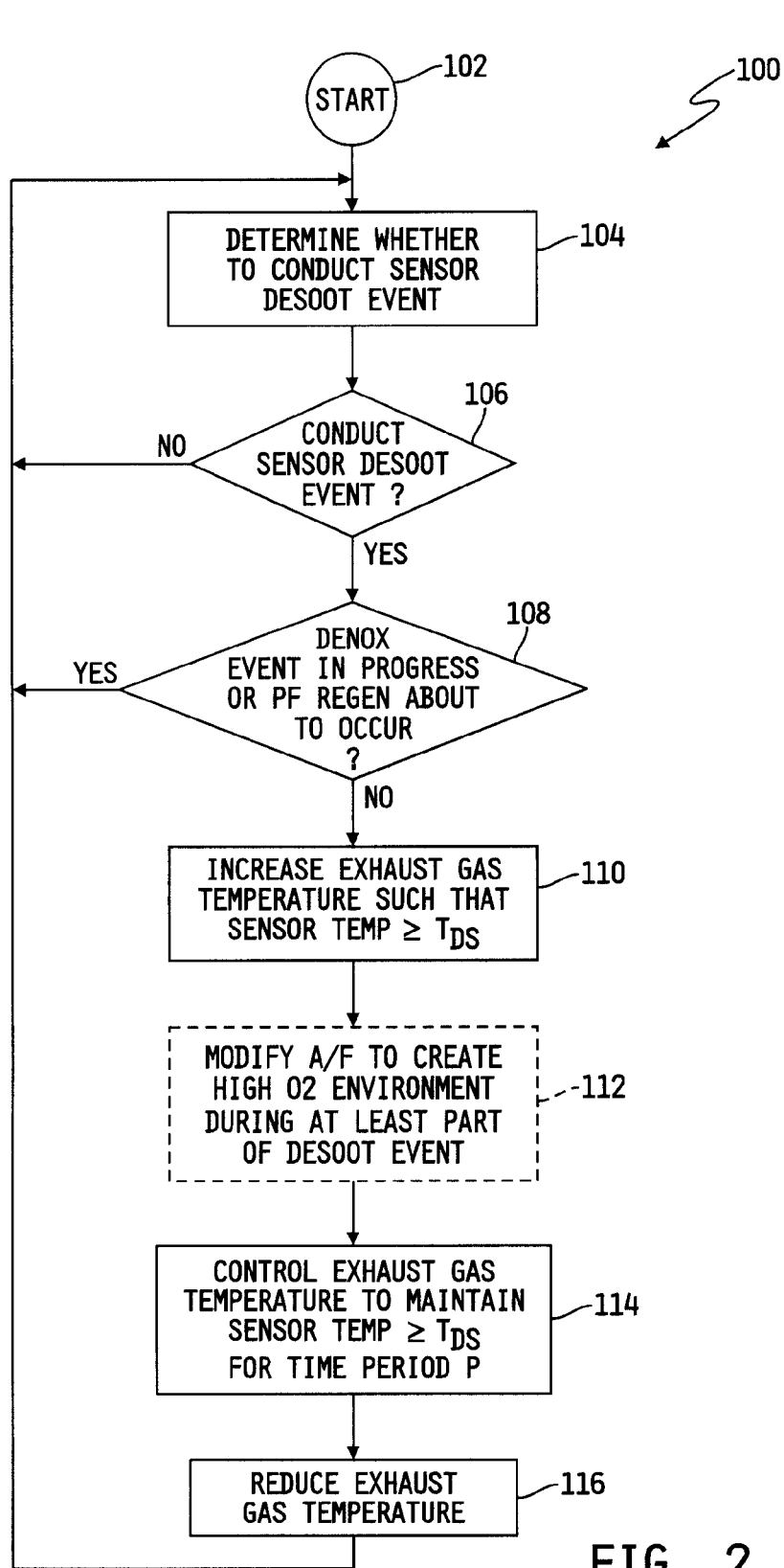
FIG. 2 is a flowchart of one illustrative process for cleaning combustion soot from exhaust gas aftertreatment sensors.

Referring now to FIG. 2, a flowchart is shown of one illustrative process 100 for cleaning combustion soot from one or more of the exhaust gas aftertreatment sensors 54, 58, 62, 68 and/or 72. The process 100 represents one illustrative embodiment of the exhaust gas sensor desoot control algorithm 52 illustrated in FIG. 1, and can be stored in the memory unit of the control circuit 50 in the form of instructions that are executable by the control circuit 50 to clean combustion soot from one or more of the exhaust gas aftertreatment sensors 54, 58, 62, 68 and/or 72. The process 100 begins at step 102, and thereafter a step 104 the control circuit 50 is operable to determine whether to conduct a sensor desoot event. This disclosure contemplates a number of different techniques and strategies for carrying out step 104 of the process 100, and some example implementations of step 104 will be illustrated and described hereinafter. In any case, step 104 of the process 100 advances to step 106 where the control circuit 50 is operable to determine whether to conduct a sensor desoot event based on the outcome of step 104. If it is determined that step 104 that a sensor desoot event should not be conducted, execution of the process 100 loops back to re-execute step 104. If, on the other hand, it is determined at step 104 that a sensor desoot event should be conducted, execution of the process 100 advances from step 106 to step 108.

At step 108, the control circuit 50 is operable, in embodiments of the system 10 that include a NOx adsorber, to determine whether a deNOx event, e.g., regeneration of a NOx adsorber, is currently in process and/or, in embodiments of the system 10 that include a particulate filter, whether a particulate filter regeneration event is about to occur. If a deNO$_x$ event is currently in process or a particulate filter regeneration is about to occur, execution of the process 100 loops back to step 104. If, on the other hand, a deNOx event is not currently in process and a particulate filter regeneration is not about to occur, execution of the process 100 advances to step 110.

At step 110, the control circuit 50 is operable to control the system 10 to increase the exhaust gas temperature such that the temperature of a particular one or more of the exhaust gas aftertreatment sensors, e.g., any one or more of the sensors 54, 58, 62, 68 and 72, is greater than or equal to a desoot temperature $T_{DS}$. In the embodiment illustrated in FIG. 1, for example, the control circuit 50 is operable at step 110 to increase the exhaust gas temperature by controlling the fuel system 78 in a conventional manner to introduce hydrocarbons, in the form of unburned fuel, into the exhaust gas produced by the engine 12, e.g., according to a conventional post-injection fuel control strategy. The injected hydrocarbons react with the oxidation catalyst 32 according to a known exothermic reaction that causes the oxidation catalyst 32 to heat the exhaust gas flowing through the oxidation catalyst 32. In order to achieve an exhaust gas temperature at a particular one or more of the sensors 54, 58, 62, 68 and 72, the exhaust gas temperature at or near such one or more sensors may be determined by processing a corresponding one or more of the temperature signals produced by the temperature sensors 58 and/or 68, and/or by estimating a temperature at or near one or more of the sensors 54, 58, 62, 68 and 72 via conventional techniques. In any case, with the temperature at or near a particular one or more of the sensors 54, 58, 62, 68 and 72 known, the control circuit 50 is operable in a conventional manner to control the amount of hydrocarbons introduced into the exhaust stream to achieve an exhaust gas temperature at or near a particular one or more of the sensors 54, 58, 62, 68 and 72 of greater than or equal to $T_{DS}$. It will be understood that other conventional techniques for selectively heating the exhaust gas produced by the engine 12 may be used as step 110, and any such other conventional techniques are contemplated by disclosure.

The process 100 may include an optional step 112 as illustrated in FIG. 1 by dashed-line representation. In embodiments that include step 112, the process 100 advances from step 110 to step 112 where the control circuit 50 is operable to modify the air fuel ratio (A/F) supplied to the engine 12 in a manner that increases the residual oxygen in the exhaust gas stream during at least part of the sensor desoot event, i.e., to achieve a lean air-to-fuel mixture such that $\lambda > 1$; $\lambda = (A/F_{CURRENT})/(A/F_{STOICH})$. In embodiments of the system 10 that do not include the air intake throttle 82, step 112 may be achieved by modifying the fueling of the engine 12, via control of the fuel system 78, to decrease the amount of fuel supplied to the engine 12 to create a lean A/F mixture. On the other hand, embodiments that do include the air intake throttle 82, the control circuit 50 may be operable to execute step 112 by controlling intake air flow, via control of the air intake throttle 82, and/or by modifying fueling of the engine 12, via control of the fuel system 78, increase the residual oxygen in the exhaust gas stream.

Step 112 advances to step 114, and in embodiments of the process 100 that do not include step 112, step 110 advances to step 114, where the control circuit 50 is operable to control the exhaust gas temperature to maintain the temperature of the particular one or more of the sensors 54, 58, 62, 68, 72 at or above the sensor desoot temperature, $T_{DS}$, for a time period, P. Illustratively, P may range from a few seconds to several minutes. In embodiments of the process 100 that include step 112, it may be necessary to introduce additional hydrocarbons into the exhaust gas upstream of the oxidation catalyst 32 in order to maintain the temperature of the particular one or more of the sensors 54, 58, 62, 68, 72 at or above the sensor desoot temperature, $T_{DS}$, while also controlling the air-to-fuel ratio in a manner that increases the residual oxygen in the exhaust gas stream. In any case, following step 114, the process 100 advances to step 116 where the control circuit 50 is operable to reduce the exhaust gas temperature. This disclosure contemplates a number of different strategies and techniques for executing step 116 of the process 100, and some example implementations of step 116 will be illustrated and described hereinafter. In any case, execution of the process 100 loops from step 116 back to step 104 for continual execution of the process 100. Alternatively, the process 100 may terminate after execution of step 116, and the process 100 may then be re-executed as desired Referring now to FIG. 3A, a flowchart of one illustrative process 104' for carrying out step 104 of the process 100 illustrated in FIG. 2 is shown. In the illustrated embodiment, the process 104' begins as step 120 where the control circuit 50 is operable to determine the oxygen concentration ($O2_1$) of the exhaust gas being produced by the engine 12 at the current air-to-fuel ratio (A/F). In the illustrated embodiment, the control circuit 50 is operable to execute step 120 by measuring $O2_1$ by processing the oxygen concentration signal produced by a selected one of the oxygen sensors 54, 62 and 72. Thereafter at step 122, the control circuit 50 is operable to modify the air-to-fuel ratio (A/F) in a manner that produces a discernibly different exhaust gas oxygen concentration value. Illustratively, the control circuit 50 is operable to execute step 122 using any of the techniques described hereinabove in respect to step 112 of the process 100. Thereafter at step 124, the control circuit 50 resets an internal timer.

The process 104' advances from step 124 to step 126 where the control circuit 50 is operable to determine the oxygen concentration ($O2_2$) of the exhaust gas produced by the engine 12 at the modified air-to-fuel ratio (A/F). Illustratively, the control circuit 50 is operable to execute step 126 identically to the execution of step 120. Following step 126, execution of the process 104' advances to step 128 where the control circuit 50 is operable to compare a difference between the two oxygen concentration measurements, $O2_1$ and $O2_2$, to a difference threshold, $M_{CHG}$. Illustratively, the control circuit 50 is operable to execute step 128 by first computing an absolute value of the difference between $O2_1$ and $O2_2$, and then determining whether the absolute value of this difference is greater than the difference threshold, $M_{CHG}$. If so, execution of the process 104' advances to step 130 where the control circuit 50 determines that a sensor desoot event should not be conducted. Thereafter, the process 104' advances to step 132 where the process 104' is returned to the process 100 of FIG. 2. If, on the other hand, the control circuit 50 determines at step 128 that the absolute value of the difference between $O2_1$ and $O2_2$ is not greater than $M_{CHG}$, execution of the process 104' advances to step 134 where the control circuit 50 compares the current value of its internal timer to a predetermined time value, $SL_{TH}$. Illustratively, $SL_{TH}$ corresponds to a sensor lag time period after which a correctly functioning oxygen sensor should be expected to produce a signal that accurately reflects the current oxygen concentration of the exhaust gas. In any case, if the control circuit 50 determines that step 134 that the timer value has not exceeded $SL_{TH}$, execution of the process 104' loops back to step 126. If, however, the control circuit 50 determines that step 134 that the timer value has exceeded $SL_{TH}$, execution of the process 104' advances to step 136 where the control circuit 50 determines that a sensor desoot event should be conducted. Thereafter, execution of the process 104' advances to step 132 where the process 104' is returned to the process 100 of FIG. 2.

When enough soot has accumulated on oxygen sensors of the type that are conventionally used in exhaust gas aftertreatment systems for internal combustion engines, such oxygen sensors may typically produce erroneous readings and/or may react slowly to changes in oxygen concentration of the exhaust gas. The process 104' is therefore generally operable to determine whether a sensor desoot event should be undertaken by deliberately changing the oxygen concentration of the exhaust gas and then observing the reaction of a selected one of the oxygen sensors included in the exhaust gas aftertreatment system over time. The process 104' may be repeated for each oxygen sensor included in the exhaust gas aftertreatment system, or the process 104' may be modified to test each oxygen sensor in the exhaust gas aftertreatment system. Such modifications to the process 104' would be a mechanical step for a skilled programmer. In any case, it will be understood that different oxygen sensors included in the exhaust gas aftertreatment system will accumulate soot at different rates depending upon the number and type of exhaust gas aftertreatment catalysts included in the system 10 and also on the locations of the different oxygen sensors relative to the various exhaust gas aftertreatment catalysts. Testing of the various oxygen sensors in the exhaust gas aftertreatment system using the process 104' may therefore include conventional steps for testing one or more oxygen sensors more frequently than others, and/or for testing the various oxygen sensors according to a predetermined sequence of oxygen sensors. It will be further understood that the process 104' may be additionally or alternatively modified to determine whether a sensor desoot event should be undertaken by deliberately changing the temperature of the exhaust gas and then observing the reaction of a selected one or more of the temperature sensors included in the exhaust gas aftertreatment system over time. When enough soot has accumulated on temperature sensors of the type that are conventionally used in exhaust gas aftertreatment systems for internal combustion engines, such temperature sensors may typically continue to produce correct readings if given enough time to react, but may react discernibly more slowly to changes in temperature of the exhaust gas. In any case, such additional or alternative modifications to the process 104' would be a mechanical step for a skilled programmer.

Figure 3A:
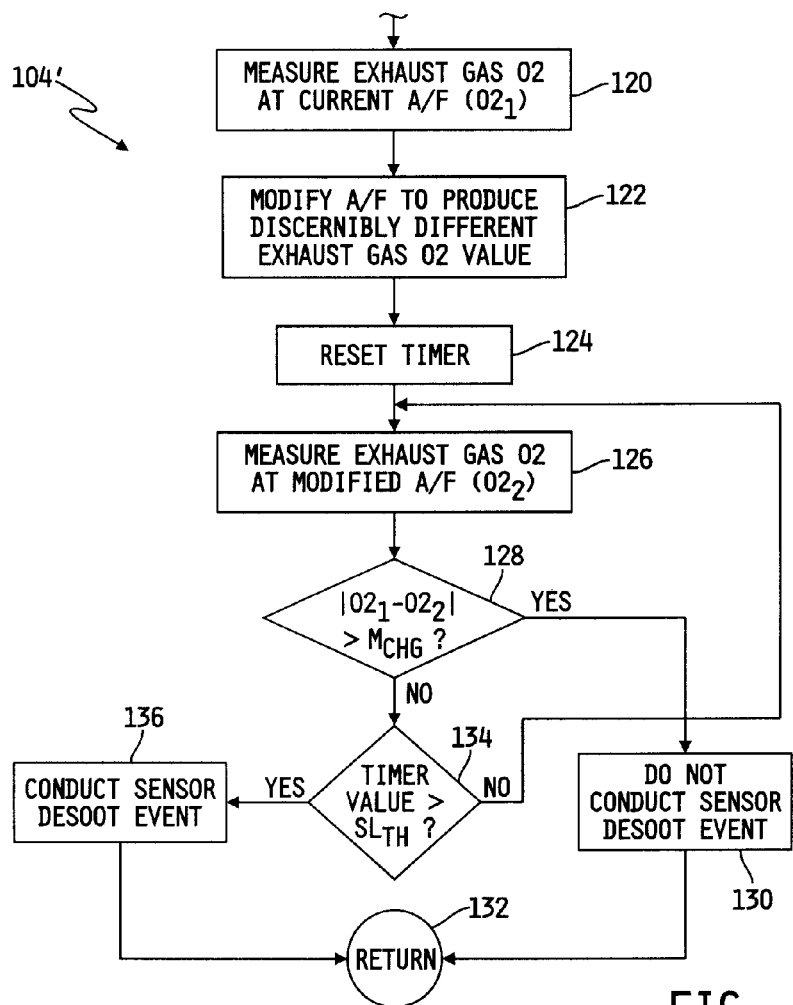
FIG. 3A is a flowchart of one illustrative process for carrying out step 104 of the process illustrated in FIG. 2.
Figure 3B:
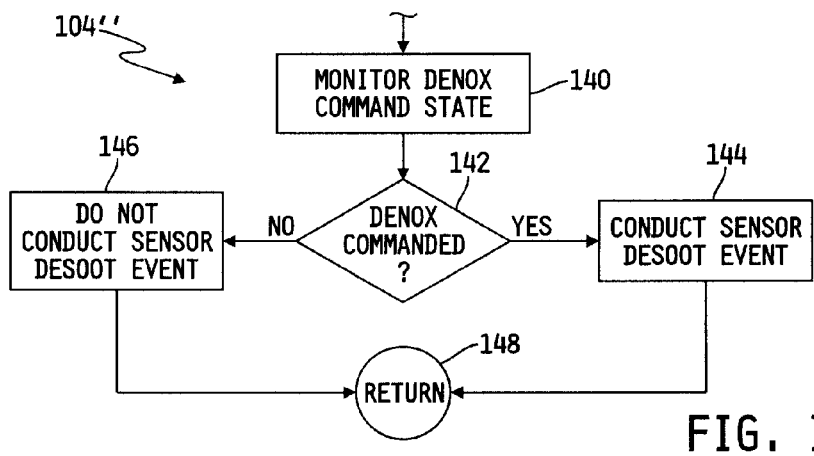
FIG. 3B is a flowchart of another illustrative process for carrying out step 104 of the process illustrated in FIG. 2.

Referring now to FIG. 3B, a flowchart of another illustrative process 104" for carrying out step 104 of the process 100 illustrated in FIG. 2 is shown. In this embodiment, the process 104" presumes that at least one of the aftertreatment catalysts 36, 40 ad 44 is a $NO_X$ adsorber catalyst (NAC), and that the memory unit of the control circuit 50 includes at last one set of instructions stored therein that is executable by the control circuit 50 to control periodic NAC regeneration events, e.g., $deNO_X$ events, in which the NAC is periodically regenerated according to conventional techniques. In this embodiment, the control circuit 50 thus has knowledge, pursuant to execution of the at least one $NO_X$ regeneration algorithm, of the current $deNO_X$ command state, i.e., whether a $deNO_X$ event is, or is not, currently commanded and about to occur.

The process 104" begins as step 140 where the control circuit 50 is operable to monitor a deNOx command state, as just described, and thereafter at step 142 is operable to determine whether, based on execution of the step 140, a $deNO_X$ event is currently commanded and is therefore about to occur, i.e., is pending. If the control circuit 50 determines the step 142 that $deNO_X$ is currently commanded, execution of the process 104" advances to step 144 where the control circuit 50 determines that a sensor desoot event should be conducted. If, on the other hand, the control circuit 50 determines this step 142 that a $deNO_X$ event has not been commanded, execution of the process 104" advance is to step 146 where the control circuit 50 determines that a sensor desoot event should not be conducted. Both of the steps 144 and 146 advance to step 148 where the process 104" is returned to the process 100 of FIG. 2. The process 104" thus bases the decision of whether to conduct a sensor desoot event on whether a deNOx event is pending. If so, the control circuit 50 is operable to conduct the sensor desoot event prior to conducting the deNOx event. If not, the control circuit 50 does not conduct the sensor desoot event.

Referring now to FIG. 3C, yet another illustrative embodiment of a process 104''' for carrying out step 104 of the process 100 illustrated in FIG. 2 is shown. In the illustrated embodiment, the process 104''' begins as step 160 where the control circuit 50 is operable to determine whether a desoot timer within the control circuit 50 is greater than a time period, $T_{ds}$. If so, the process 104''' advances to step 162 where the control circuit 50 is operable to determine that a sensor desoot event should be conducted. If, however, the control circuit 50 determines that step 160 that the sensor desoot timer is not greater than $T_{ds}$, the process 104''' advances to step 164 where the control circuit 50 is operable to determine that a sensor desoot event should not be conducted. Both of the steps 162 and 164 advance to step 166 where the process 104''' is returned to the process 100 of FIG. 2. The process 104''' thus bases the decision of whether to conduct a sensor desoot event on the status of a timer monitored by the control circuit 50. In accordance with the process 104''', the control circuit 50 is operable to conduct the sensor desoot event only if a predetermined time period since last conducting a sensor desoot event has elapsed.

Referring now to FIG. 3D, still another illustrative embodiment of a process 104'''' for carrying out step 104 of the process 100 of FIG. 2 is shown. In the illustrated embodiment, the process 104'''' begins as step 170 where the control circuit 50 is operable to determine whether a fuel quantity accumulator value is greater than a fuel quantity threshold, $FQ_{th}$. If so, the process 104'''' advances to step 172 where the control circuit 50 is operable to determine that a sensor desoot event should be conducted. If, on the other hand, the control circuit 50 determines that step 170 that the injected fuel quantity accumulator value is not greater than the fuel quantity threshold, $FQ_{th}$, the process 104'''' advances to step 174 where the control circuit 50 is operable to determine that a sensor desoot event should not be conducted. Both steps 172 and 174 advance to step 176 where the process 104'''' is returned to the process 100 of FIG. 2. In accordance with the process 104'''', the control circuit 50 is operable to continually monitor the fueling command signals provided to the fuel system 78, and to continually update a fuel quantity accumulator location in the memory unit. The fuel quantity accumulator value thus corresponds to an amount of fuel that has been used by the engine 12 since the fuel quantity accumulator was last reset. The process 104'''' bases the decision of whether to conduct a sensor desoot event on the current value the fuel quantity accumulator relative to a predetermined threshold value. In accordance with the process 104'''', the control circuit 50 is operable to conduct the sensor desoot event only when the fuel quantity accumulator value exceeds the threshold value.

Referring now to FIG. 4A, one illustrative embodiment of a process 116' for carrying out step 116 of the process 100 of FIG. 2 is shown. In the illustrated embodiment, the process 116' begins as step 180 where the control circuit 50 is operable to reduce the temperature of the exhaust gas to a normal exhaust gas operating temperature range. In this context, the "normal exhaust gas operating temperature range" is defined as a range of exhaust gas temperatures that exist during conventional operation of the engine 12 with no attempt to deliberately increase exhaust gas temperatures for the purpose of regenerating or cleaning any component of the exhaust gas aftertreatment system. Illustratively, the control circuit 50 is operable to execute step 180 by discontinuing or reversing the control techniques undertaken at step 110 of the process 100 to increase the exhaust gas temperature. For example, in embodiments in which the control circuit 50 is operable to execute step 100 by controlling the fuel system 78 in a conventional manner to introduce hydrocarbons, in the form of unburned fuel, into the exhaust gas produced by the engine 12, e.g., according to a conventional post-injection fuel control strategy, the control circuit 50 is operable at step 180 to discontinue controlling the fuel system 78 in this manner and to instead control the fuel system 78 in a conventional manner without any post-injection fueling. Those skilled in the art will recognize that in other embodiments of the system 10 that increase the exhaust gas temperature via other conventional techniques and/or other sources of hydrocarbons, step 180 may be executed in such alternate embodiments by discontinuing or reversing the actions used to increase the exhaust gas temperature. In any case, the process 116' includes an optional step 182 that may be included in embodiments of the process 100 that include the optional step 112, and that may otherwise be omitted. In embodiments of the process 116' that do include step 182, the control circuit 50 is operable at step 182 to return A/F control to the one or more normal, i.e., conventional, fueling algorithms that were in control of A/F prior to executing step 112 so that A/F is controlled in a manner that decreases the oxygen content of the exhaust gas after the temperature of the sensor has been at or above the desoot temperature, $T_{DS}$, for at least part of the desoot time period, P. From step 182 in embodiments of the process 116' that include step 182, or from step 180 in embodiments of the process 116' that do not include step 182, execution of the process 116' advances to step 184 where the process 116' is returned to the process 100 of FIG. 2. Generally, the process 116' illustrated in FIG. 4A is intended to be used to execute step 116 of the process 100 of FIG. 2 primarily when the process 104' of FIG. 3A is used to execute step 104 of the process 100, although it will be understood that the process 116' may alternatively be used to execute step 116 of the process 100 when other processes are used to execute step 104 of the process 100.

Referring now to FIG. 4B, another illustrative embodiment of a process 116" for carrying out step 116 of the process 100 of FIG. 2 is shown. In the illustrated embodiment, the process 116" begins as step 190 where the control circuit 50 is operable to reduce the temperature of the exhaust gas to a deNOx exhaust gas temperature, $T_{DN}$; i.e., a NAC regeneration temperature. Generally, the deNOx exhaust gas temperature, $T_{DN}$, is less than exhaust gas temperatures required to achieve a sensor temperature of at least $T_{DS}$, and is greater than the "normal exhaust gas operating temperature" range defined above. Illustratively, the control circuit 50 is operable to execute step 190 by discontinuing or reversing the control techniques undertaken at step 110 of the process 100 to increase the exhaust gas temperature as described above. The process 116" advances from step 190 to step 192 where the control circuit 50 is operable to hand A/F control to a deNOx fueling algorithm that is operable to control A/F in a conventional manner throughout the deNOx process according to a conventional NOx regeneration fueling algorithm, e.g., by cycling A/F between lean and rich. Thereafter at step 194, the control circuit 50 is operable to wait until the deNOx event is complete, and to then return to the process 100 via step 196. Generally, the process 116" illustrated in FIG. 4B is intended to be used to execute step 116 of the process 100 of FIG. 2 primarily when the process 104" of FIG. 3B is used to execute step 104 of the process 100, although it will be understood that the process 116" may alternatively be used to execute step 116 of the process 100 when other processes are used to execute step 104 of the process 100. The specific case of the process 104" being used to execute step 104 of the process 100 and the process 116" being used to execute step 116 of the process 100 is illustrated graphically in FIG. 5. Referring specifically to FIG. 5, a plot 220 of exhaust gas temperature vs. time is shown for the specific application of the process 100 for cleaning combustion soot from an oxygen sensor that is positioned just upstream of a NOx adsorber catalyst (NAC). During the initial time period of the plot, the exhaust gas temperature is in the "normal" range, and does not deviate significantly. When the control circuit 50 determines that a deNOx event has been commanded and is therefore pending (step 104—process 104"), the control circuit 50 begins to increase the exhaust gas temperature such that the temperature of the oxygen sensor positioned just upstream of the NAC is greater than or equal to $T_{DS}$ (step 110) for at least the time period P (step 114), and the control circuit 50 thereafter decreases the exhaust gas temperature to the deNOx temperature, $T_{DN}$, (step 116—process 116").

Referring now to FIG. 4C, yet another illustrative embodiment of a process 116''' for carrying out step 116 of the process 100 of FIG. 2 is shown. In the illustrated embodiment, the process 116''' begins as step 200 where the control circuit 50 is operable to reduce the temperature of the exhaust gas to a normal exhaust gas operating temperature range. The process 116''' includes an optional step 202 that may be included in embodiments of the process 100 that include the optional step 112, and that may otherwise be omitted. Steps 200 and 202 of the process 116''' may illustratively be identical to steps 180 and 182 and/or any alternatives, as described in detail hereinabove. From step 202 in embodiments of the process 116''' that include step 202, or from step 200 in embodiments of the process 116''' that do not include step 202, execution of the process 116''' advances to step 204 where the processor 50 is operable to reset the sensor desoot timer. Thereafter at step 206, the process 116''' is returned to the process 100 of FIG. 2. Generally, the process 116''' illustrated in FIG. 4C is intended to be used to execute step 116 of the process 100 of FIG. 2 primarily when the process 104''' of FIG. 3C is used to execute step 104 of the process 100 so that the sensor desoot timer is reset following a sensor desoot event and is otherwise monitored to determine timing for the next sensor desoot event. It will be understood, however, that a sensor desoot timer may be implemented in other embodiments of the process 104 so that the process 116''' may alternatively be used to execute step 116 of the process 100 when such other processes are used to execute step 104 of the process 100.

Referring now to FIG. 4D, still another illustrative embodiment of a process 116'''' for carrying out step 116 of the process 100 of FIG. 2 is shown. In the illustrated embodiment, the process 116'''' begins as step 210 where the control circuit 50 is operable to reduce the temperature of the exhaust gas to a normal exhaust gas operating temperature range. The process 116'''' includes an optional step 212 that may be included in embodiments of the process 100 that include the optional step 112, and that may otherwise be omitted. Steps 210 and 212 of the process 116'''' may illustratively be identical to steps 180 and 182 and/or any alternatives, as described in detail hereinabove. From step 212 in embodiments of the process 116'''' that include step 212, or from step 210 in embodiments of the process 116'''' that do not include step 212, execution of the process 116'''' advances to step 214 where the processor 50 is operable to reset the injected fuel quantity accumulator. Thereafter at step 216, the process 116'''' is returned to the process 100 of FIG. 2. Generally, the process 116'''' illustrated in FIG. 4D is intended to be used to execute step 116 of the process 100 of FIG. 2 primarily when the process 104'''' of FIG. 3D is used to execute step 104 of the process 100 so that the injected fuel quantity accumulator is reset following a sensor desoot event and is otherwise monitored to determine timing for the next sensor desoot event. It will be understood, however, that an injected fuel quantity accumulator may be implemented in other embodiments of the process 104 so that the process 116'''' may alternatively be used to execute step 116 of the process 100 when such other processes are used to execute step 104 of the process 100.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method of cleaning combustion soot from a sensor associated with an exhaust gas aftertreatment system configured to receive exhaust gas produced by an internal combustion engine, the method comprising:
    determining whether to conduct a sensor desoot event,
    if it is determined that a sensor desoot event is to be conducted,
        increasing exhaust gas temperature such that a temperature of the sensor correspondingly increases to or above a desoot temperature,
        controlling the exhaust gas temperature to maintain the temperature of the sensor at or above the desoot temperature for a predefined time period, and
        reducing the exhaust gas temperature after the temperature of the sensor has been at or above the desoot temperature for the predefined time period, and
    carrying out the acts of increasing exhaust gas temperature, controlling the exhaust gas temperature and reducing the exhaust gas temperature only if regeneration of an exhaust gas aftertreatment component comprising part of the exhaust gas aftertreatment system is neither in process nor is about to occur.

2. The method of claim 1 further comprising controlling a ratio of air and fuel supplied to the engine in a manner that increases an oxygen content of the exhaust gas for at least part of the predefined time period.

3. The method of claim 2 further comprising controlling the ratio of air and fuel supplied to the engine in a manner that decreases the oxygen content of the exhaust gas after the temperature of the sensor has been at or above the desoot temperature for the at least part of the predefined time period.

4. A method of cleaning combustion soot from a sensor associated with an exhaust gas aftertreatment system configured to receive exhaust gas produced by an internal combustion engine, the method comprising:
    determining whether to conduct a sensor desoot event by
        measuring an oxygen concentration of the exhaust gas at a current ratio of air and fuel supplied to the engine,
        modifying the ratio of air and fuel supplied to the engine to produce a discernibly different oxygen concentration of the exhaust gas,
        measuring the oxygen concentration of the exhaust gas after modifying the ratio of air and fuel supplied to the engine, and
        determining that a sensor desoot event is to be conducted if a difference between the measured oxygen concentration prior to modification of the ratio of air and fuel and the measured oxygen concentration after modification of the ratio of air and fuel does not exceed a threshold value within a predetermined time period following modification of the ratio of air and fuel, and otherwise determining that a sensor desoot event is not to be conducted, and
    if it is determined that a sensor desoot event is to be conducted,
        increasing exhaust gas temperature such that a temperature of the sensor correspondingly increases to or above a desoot temperature,
        controlling the exhaust gas temperature to maintain the temperature of the sensor at or above the desoot temperature for a predefined time period, and reducing the exhaust gas temperature after the temperature of the sensor has been at or above the desoot temperature for the predefined time period.

5. The method of claim 4 wherein reducing the exhaust gas temperature comprises reducing the exhaust gas temperature to a normal exhaust gas temperature.

6. A method of cleaning combustion soot from a sensor associated with an exhaust gas aftertreatment system configured to receive exhaust gas produced by an internal combustion engine, the method comprising:
   determining whether to conduct a sensor desoot event by
   determining whether regeneration of a NOx catalyst comprising part of the exhaust gas aftertreatment system has been commanded, and
   determining that a sensor desoot event is to be conducted if regeneration of the NOx catalyst has been commanded, and otherwise determining that a sensor desoot event is not to be conducted, and
   if it is determined that a sensor desoot event is to be conducted,
      increasing exhaust gas temperature such that a temperature of the sensor correspondingly increases to or above a desoot temperature,
      controlling the exhaust gas temperature to maintain the temperature of the sensor at or above the desoot temperature for a predefined time period, and
      reducing the exhaust gas temperature after the temperature of the sensor has been at or above the desoot temperature for the predefined time period.

7. The method of claim 6 wherein reducing the exhaust gas temperature comprises reducing the exhaust gas temperature to a NOx regeneration temperature.

8. The method of claim 7 further comprising controlling fueling of the engine according to a NOx regeneration fueling algorithm.

9. A method of cleaning combustion soot from a sensor associated with an exhaust gas aftertreatment system configured to receive exhaust gas produced by an internal combustion engine, the method comprising:
   determining whether to conduct a sensor desoot event by
   determining whether a predetermined amount of fuel has been supplied to the engine since last conducting a sensor desoot event, and
   determining that a sensor desoot event is to be conducted if at least the predetermined amount of fuel has been supplied to the engine since last conducting a sensor desoot event, and
   if it is determined that a sensor desoot event is to be conducted,
      increasing exhaust gas temperature such that a temperature of the sensor correspondingly increases to or above a desoot temperature,
      controlling the exhaust gas temperature to maintain the temperature of the sensor at or above the desoot temperature for a predefined time period, and
      reducing the exhaust gas temperature after the temperature of the sensor has been at or above the desoot temperature for the predefined time period.

10. The method of claim 9 wherein reducing the exhaust gas temperature comprises reducing the exhaust gas temperature to a normal exhaust gas temperature.

11. A system for cleaning combustion soot from an exhaust gas aftertreatment sensor, the system comprising:
   an exhaust gas conduit fluidly coupled to an exhaust manifold of an internal combustion engine, the exhaust gas conduit configured to receive therethrough exhaust gas produced by the engine,
   an oxidation catalyst disposed in-line with the exhaust gas conduit, the sensor being in fluid communication with the exhaust gas conduit downstream of the oxidation catalyst,
   at least one exhaust gas aftertreatment component disposed in-line with the exhaust gas conduit downstream of the oxidation catalyst,
   a fuel system responsive to a fueling signal to supply fuel to the engine, and
   a control circuit configured to produce the fueling signal, the control circuit including a memory having stored therein instructions that are executable by the control circuit to determine whether to conduct a sensor desoot event, and to conduct the sensor desoot event, only if it is determined that the sensor desoot event is to be conducted, by controlling the fueling signal in a manner that causes the oxidation catalyst to increase a temperature of exhaust gas exiting therefrom such that a temperature of the sensor is at or above a desoot temperature, thereafter controlling the fueling signal in a manner that causes the oxidation catalyst to maintain the temperature of the sensor at or above the desoot temperature for a predefined time period, and thereafter controlling the fueling signal in a manner that causes the oxidation catalyst to decrease the temperature of exhaust gas exiting therefrom,
   wherein the instructions stored in the memory include instructions that are executable by the control circuit to control a ratio of air and fuel supplied to the engine in a manner that increases an oxygen content of the exhaust gas for at least part of the predefined time period.

12. The system of claim 11 wherein the instructions stored in the memory include instructions that are executable by the control circuit to control the ratio of air and fuel supplied to the engine in a manner that decreases the oxygen content of the exhaust gas after the temperature of the sensor has been at or above the desoot temperature for the at least part of the predefined time period.

13. The system of claim 11 wherein the instructions stored in the memory that are executable by the control circuit to determine whether to conduct a sensor desoot event include instructions that are executable by the control circuit to determine whether a time period since last conducting a sensor desoot event has elapsed, and to determine that a sensor desoot event is to be conducted if the time period since last conducting a sensor desoot event has elapsed.

14. A system for cleaning combustion soot from an exhaust gas aftertreatment sensor, the system comprising:
   an exhaust gas conduit fluidly coupled to an exhaust manifold of an internal combustion engine, the exhaust gas conduit configured to receive therethrough exhaust gas produced by the engine,
   an oxidation catalyst disposed in-line with the exhaust gas conduit, the sensor being in fluid communication with the exhaust gas conduit downstream of the oxidation catalyst,
   at least one exhaust gas aftertreatment component disposed in-line with the exhaust gas conduit downstream of the oxidation catalyst,
   a fuel system responsive to a fueling signal to supply fuel to the engine, and
   a control circuit configured to produce the fueling signal, the control circuit including a memory having stored therein instructions that are executable by the control circuit to determine whether to conduct a sensor desoot event, and to conduct the sensor desoot event, only if it is determined that the sensor desoot event is to be conducted, by controlling the fueling signal in a manner that causes the oxidation catalyst to increase a temperature of exhaust gas exiting therefrom such that a temperature of the sensor is at or above a desoot temperature, thereafter controlling the fueling signal in a manner that causes the oxidation catalyst to maintain the temperature of the sensor at or above the desoot temperature for a predefined time period, and thereafter controlling the fueling signal in a manner that causes the oxidation catalyst to decrease the temperature of exhaust gas exiting therefrom, and wherein the instructions stored in the memory that are executable by the control circuit to determine whether to conduct a sensor desoot event include instructions that are executable by the control circuit to measure an oxygen concentration of the exhaust gas at a current ratio of air and fuel supplied to the engine, to then modify the ratio of air and fuel supplied to the engine to produce a discernibly different oxygen concentration of the exhaust gas, to measure the oxygen concentration of the exhaust gas after modifying the ratio of air and fuel supplied to the engine, and to then determine that a sensor desoot event is to be conducted if a difference between the measured oxygen concentration prior to modification of the ratio of air and fuel and the measured oxygen concentration after modification of the ratio of air and fuel does not exceed a threshold value within a predetermined time period following modification of the ratio of air and fuel, and otherwise determining that a sensor desoot event is not to be conducted.

15. The system of claim 14 wherein the sensor is an oxygen sensor configured to produce an oxygen signal corresponding to an oxygen concentration of the exhaust gas, and wherein measuring an oxygen concentration of the exhaust gas comprises processing the oxygen signal to determine the oxygen concentration of the exhaust gas.

16. A system for cleaning combustion soot from an exhaust gas aftertreatment sensor, the system comprising:

an exhaust gas conduit fluidly coupled to an exhaust manifold of an internal combustion engine, the exhaust gas conduit configured to receive therethrough exhaust gas produced by the engine, an oxidation catalyst disposed in-line with the exhaust gas conduit, the sensor being in fluid communication with the exhaust gas conduit downstream of the oxidation catalyst, at least one exhaust gas aftertreatment component disposed in-line with the exhaust gas conduit downstream of the oxidation catalyst, a fuel system responsive to a fueling signal to supply fuel to the engine, and a control circuit configured to produce the fueling signal, the control circuit including a memory having stored therein instructions that are executable by the control circuit to determine whether to conduct a sensor desoot event, and to conduct the sensor desoot event, only if it is determined that the sensor desoot event is to be conducted, by controlling the fueling signal in a manner that causes the oxidation catalyst to increase a temperature of exhaust gas exiting therefrom such that a temperature of the sensor is at or above a desoot temperature, thereafter controlling the fueling signal in a manner that causes the oxidation catalyst to maintain the temperature of the sensor at or above the desoot temperature for a predefined time period, and thereafter controlling the fueling signal in a manner that causes the oxidation catalyst to decrease the temperature of exhaust gas exiting therefrom, and wherein the at least one exhaust gas aftertreatment component includes a NOx catalyst, and wherein the instructions stored in the memory that are executable by the control circuit to determine whether to conduct a sensor desoot event include instructions that are executable by the control circuit to determine whether regeneration of the NOx catalyst has been commanded, and to determine that a sensor desoot event is to be conducted only if regeneration of the NOx catalyst has been commanded.

17. The system of claim 16 wherein the instructions stored in the memory that are executable by the control circuit to control the fueling signal in a manner that causes the oxidation catalyst to decrease the temperature of exhaust gas exiting therefrom include instructions to control the fueling signal in a manner that causes the oxidation catalyst to decrease the temperature of exhaust gas exiting therefrom to a NOx catalyst regeneration temperature.

18. The system of claim 17 wherein the instructions stored in the memory that are executable by the control circuit further include instructions to control the fueling signal in accordance with a NOx regeneration fueling algorithm after controlling the fueling signal in a manner that causes the oxidation catalyst to decrease the temperature of exhaust gas exiting therefrom to a NOx catalyst regeneration temperature.

19. A system for cleaning combustion soot from an exhaust gas aftertreatment sensor, the system comprising:

an exhaust gas conduit fluidly coupled to an exhaust manifold of an internal combustion engine, the exhaust gas conduit configured to receive therethrough exhaust gas produced by the engine, an oxidation catalyst disposed in-line with the exhaust gas conduit, the sensor being in fluid communication with the exhaust gas conduit downstream of the oxidation catalyst, at least one exhaust gas aftertreatment component disposed in-line with the exhaust gas conduit downstream of the oxidation catalyst, a fuel system responsive to a fueling signal to supply fuel to the engine, and a control circuit configured to produce the fueling signal, the control circuit including a memory having stored therein instructions that are executable by the control circuit to determine whether to conduct a sensor desoot event, and to conduct the sensor desoot event, only if it is determined that the sensor desoot event is to be conducted, by controlling the fueling signal in a manner that causes the oxidation catalyst to increase a temperature of exhaust gas exiting therefrom such that a temperature of the sensor is at or above a desoot temperature, thereafter controlling the fueling signal in a manner that causes the oxidation catalyst to maintain the temperature of the sensor at or above the desoot temperature for a predefined time period, and thereafter controlling the fueling signal in a manner that causes the oxidation catalyst to decrease the temperature of exhaust gas exiting therefrom, and wherein the instructions stored in the memory that are executable by the control circuit to determine whether to conduct a sensor desoot event include instructions that are executable by the control circuit to determine whether a predetermined amount of fuel has been supplied to the engine since last conducting a sensor desoot event, and to determine that a sensor desoot event is to be conducted if at least the predetermined amount of fuel has been supplied to the engine since last conducting a sensor desoot event.

* * * * *